United States Patent
Reist et al.

(10) Patent No.: US 8,079,463 B2
(45) Date of Patent: Dec. 20, 2011

(54) CONVEYING DEVICE, ROLLING BODY AND CONVEYING BODY

(75) Inventors: Walter Reist, Hinwil (CH); Erwin Muller, Durnten (CH)

(73) Assignee: WRH Walter Reist Holding AG, Ermatingen (CH)

( * ) Notice: Subject to any disclaimer, the term of this patent is extended or adjusted under 35 U.S.C. 154(b) by 0 days.

(21) Appl. No.: 13/042,586

(22) Filed: Mar. 8, 2011

(65) Prior Publication Data
US 2011/0155535 A1   Jun. 30, 2011

Related U.S. Application Data

(63) Continuation of application No. 11/908,193, filed as application No. PCT/CH2006/000140 on Mar. 7, 2006, now Pat. No. 7,918,331.

(30) Foreign Application Priority Data

Mar. 11, 2005  (WO) ................ PCT/CH2005/000144
May 20, 2005  (CH) ........................................ 878/05

(51) Int. Cl.
*B65G 17/00* (2006.01)
(52) U.S. Cl. ........................... 198/779; 198/850; 384/51
(58) Field of Classification Search .................. 198/799, 198/850; 193/35 C, 44, 37; 384/51
See application file for complete search history.

(56) References Cited

U.S. PATENT DOCUMENTS

| | | |
|---|---|---|
| 3,028,658 A | 4/1962 | Ortegren |
| 3,141,542 A | 7/1964 | Reid et al. |
| 3,595,377 A | 7/1971 | McCoy et al. |
| 3,923,150 A | 12/1975 | Jager |
| 4,018,322 A | 4/1977 | Brown et al. |
| 4,598,957 A | 7/1986 | Shibayama |
| RE34,924 E | 5/1995 | Highsmith |
| 5,549,391 A | 8/1996 | Engbersen et al. |
| 5,553,946 A | 9/1996 | Agari |
| 5,875,878 A | 3/1999 | Pierson |
| 6,070,479 A | 6/2000 | Shirai |
| 6,148,990 A | 11/2000 | Lapeyre et al. |
| 6,203,200 B1 | 3/2001 | Teramachi |
| 6,309,107 B1 | 10/2001 | Ueki et al. |
| 6,464,062 B1 | 10/2002 | Wendt et al. |
| 6,494,312 B2 | 12/2002 | Costanzo |
| 6,516,933 B1 | 2/2003 | Ledingham |
| 6,682,218 B2 | 1/2004 | Ishihara |

(Continued)

FOREIGN PATENT DOCUMENTS

BE            491893        10/1949

(Continued)

*Primary Examiner* — Joseph A Dillon, Jr.
(74) *Attorney, Agent, or Firm* — Rankin, Hill & Clark LLP

(57) ABSTRACT

A conveying device (100) according to the invention includes several conveying bodies (102), which roll on a guidance (101) via several rolls (3), wherein the rolls (3) are connected and mutually distanced by means of a flexible connecting body (9) The conveying bodies (102) include means (103; 104, 105) for mutual support, which prevent a movement of the conveying bodies (102) out of the guidance (101). A connecting body (9) and allocated rolls (3) form a roll body (2), wherein the roll body (2), on average, includes two or less than two rolls (3) per conveying body (102). A roll body (2) for a conveying device (100) includes a plurality of rolls (3) mutually connected in a linear manner, wherein the rolls (3) are mutually connected and distanced by means of a flexible and in particular also elastic connecting body (9). In a preferred embodiment, the connecting body (9) may be bent in at least two directions.

10 Claims, 7 Drawing Sheets

U.S. PATENT DOCUMENTS

| | | |
|---|---|---|
| 6,769,528 B2 | 8/2004 | Plesh, Sr. |
| 6,997,306 B2 | 2/2006 | Sofranec et al. |
| 7,168,546 B2 | 1/2007 | Plesh, Sr. |
| 7,204,358 B2 | 4/2007 | Mueller |
| 7,216,759 B2 | 5/2007 | Rau et al. |
| 7,364,038 B2 | 4/2008 | Damkjaer |
| 7,419,052 B2 | 9/2008 | Ozaki et al. |
| 7,419,303 B2 | 9/2008 | Kuo |
| 7,523,820 B1 | 4/2009 | Wu et al. |
| 7,527,143 B2 | 5/2009 | Krisl et al. |
| 7,563,188 B2 | 7/2009 | Ozaki et al. |
| 7,721,874 B2 | 5/2010 | Chen |
| 7,798,718 B2 | 9/2010 | Matsumoto et al. |

FOREIGN PATENT DOCUMENTS

| | | |
|---|---|---|
| DE | 1273415 | 7/1968 |
| DE | 19637624 | 3/1998 |
| DE | 10331977 | 2/2005 |
| EP | 0139287 | 5/1985 |
| EP | 0890755 | 1/1999 |
| EP | 1083347 | 3/2001 |
| GB | 2253248 | 9/1992 |
| JP | 10-110728 | 4/1998 |
| NL | 44407 | 6/1938 |
| WO | 2005/087627 | 9/2005 |
| WO | 2005/113391 | 12/2005 |
| WO | 2005/113392 | 12/2005 |

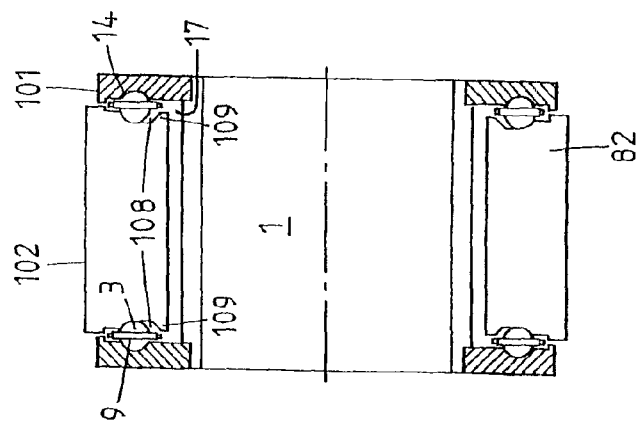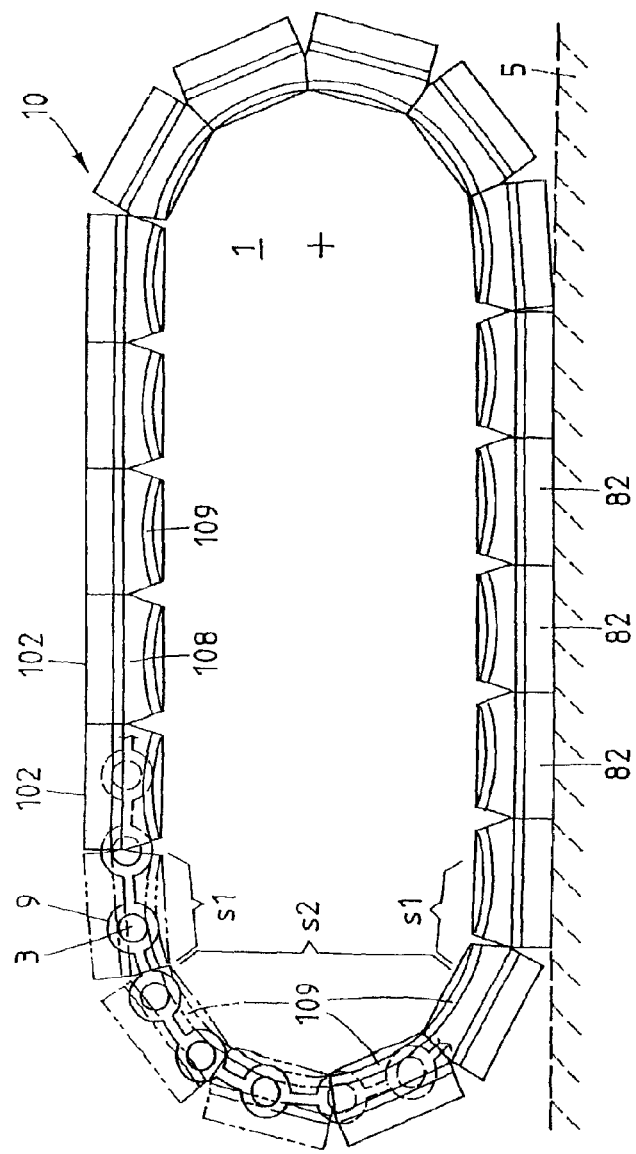

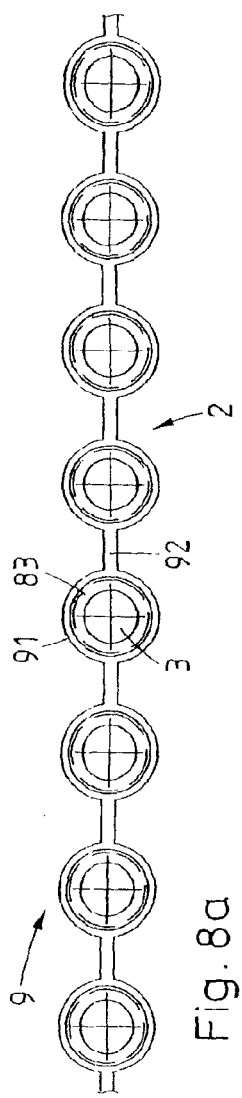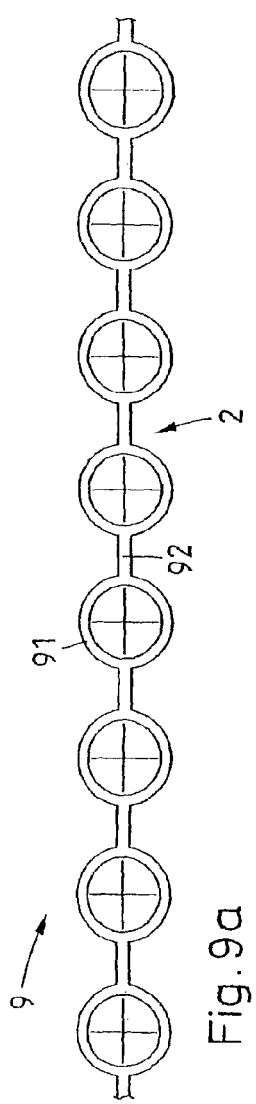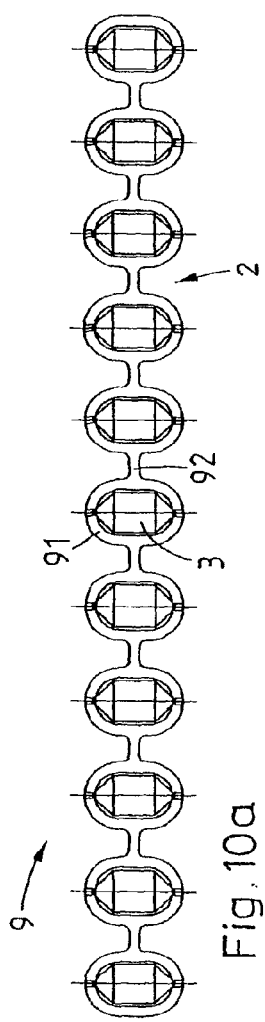

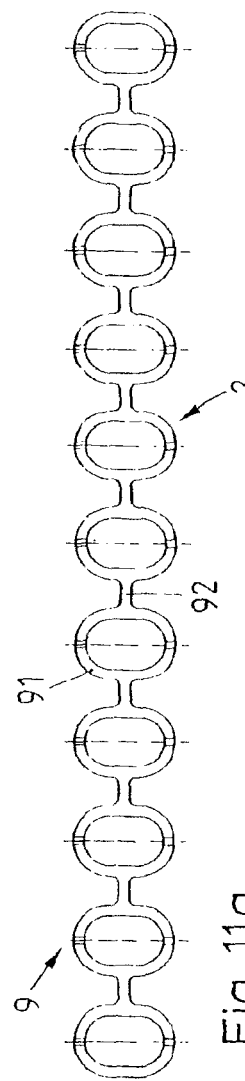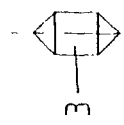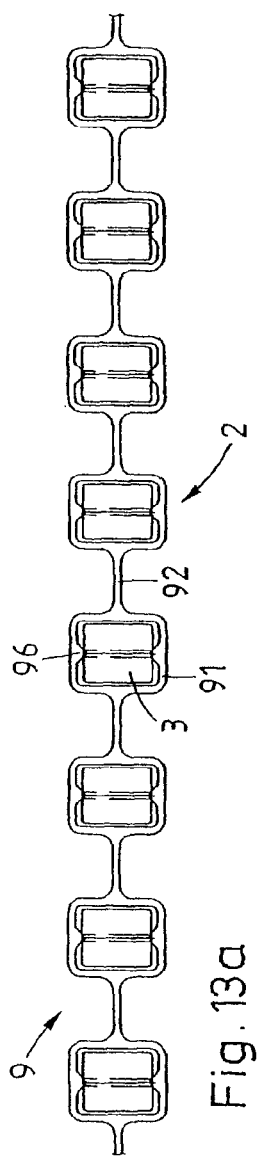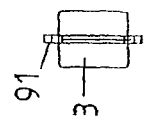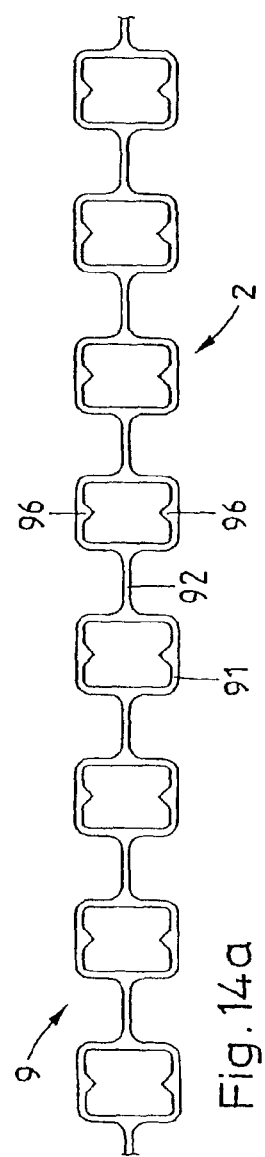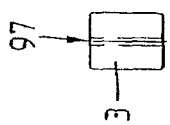

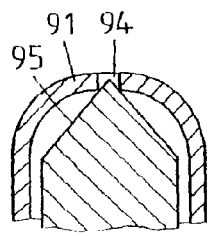 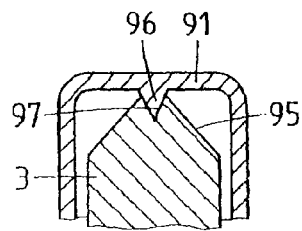 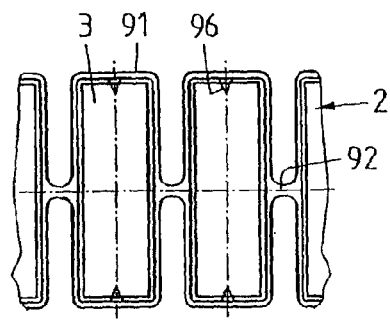
Fig. 12　　　　　Fig. 15　　　　　Fig. 16
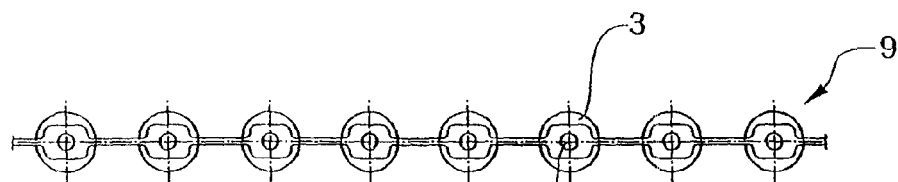
Fig. 17
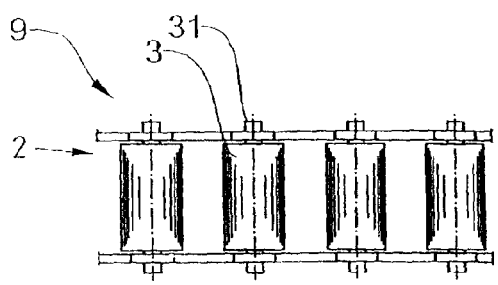 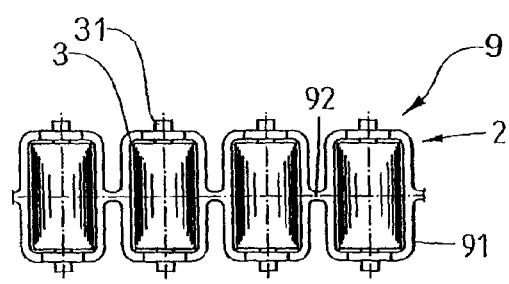
Fig. 18a　　　　　Fig. 18b

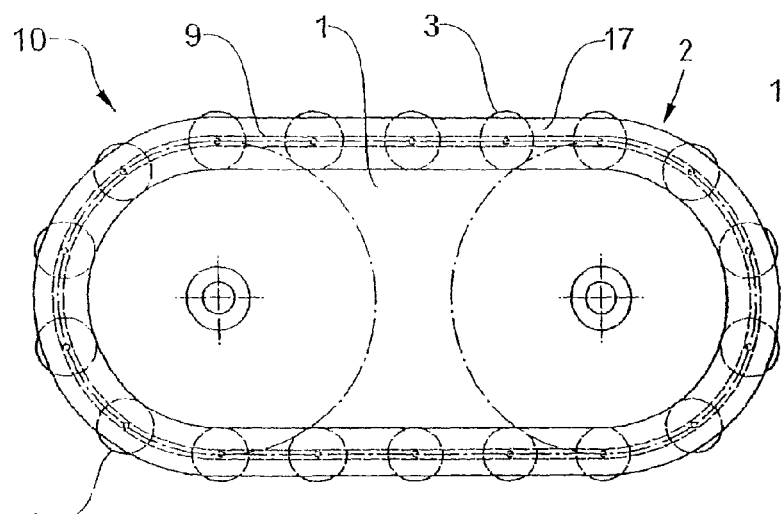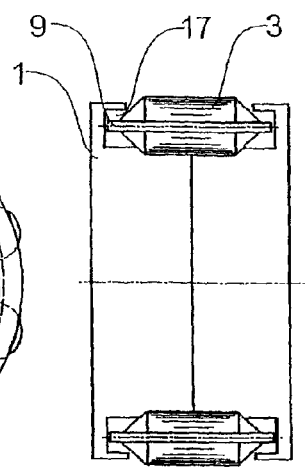
Fig. 19a  Fig. 19b
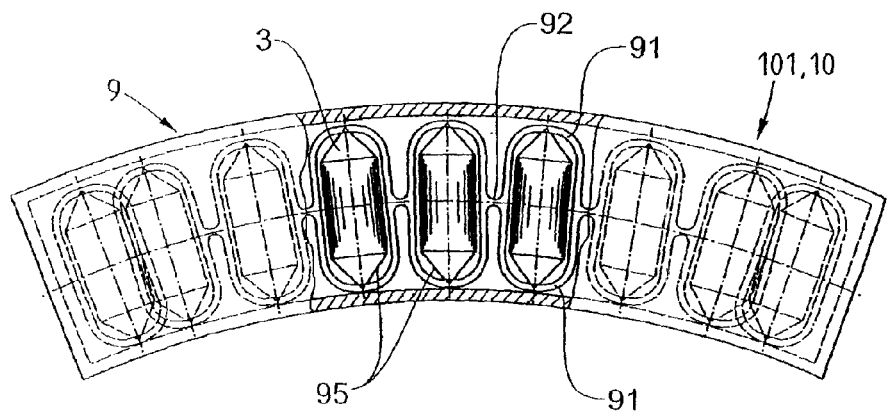
Fig. 20

CONVEYING DEVICE, ROLLING BODY AND CONVEYING BODY

This application is a continuation of U.S. application Ser. No. 11/908,193 filed on Nov. 7, 2007 and which is currently pending.

BACKGROUND OF THE INVENTION

The invention is in the field of conveying technology and concerns a conveying device and a rolling body as well as a conveying body according to the generic terms of the corresponding independent claims.

In particular the invention concerns conveying devices for transport of individual objects or bulk goods in a flowing conveying movement. Among others, the object set hereby is to create conveying devices using simple and cost-efficient means.

This object is solved by a conveying device and a roll body as well as a conveying body according to the generic term of the independent claims.

BRIEF SUMMARY OF THE INVENTION

A conveying device according to the invention comprises several conveying bodies which roll on a guidance via several rolls, wherein the rolls are mutually connected and distances by means of a flexible connecting body.

The conveying bodies advantageously include means for mutual support, which prevent a movement of the conveying bodies out of the guidance. Thus it is possible, that less rolls per conveying body are necessary because each conveying body need not be supported by multiple rolls all the time. Conversely at a given distance between rolls shorter conveying bodies may be used, which again allows smaller curve radii of the guidance or the conveying device respectively. Thus especially a connecting body and allocated rolls form a roll body, wherein the roll body on average comprises two or less rolls per conveying body in a conveying direction.

In a preferred embodiment of the invention, two roll bodies are arranged on the left and the right respectively of a sequence of conveying bodies in the guidance, and support and guide the conveying bodies. Additionally, a third roll body may run beneath the conveying bodies and absorb a larger load in vertical direction. A drive of the conveying device preferably engages on the conveying bodies, which thus move each other by pushing. Different means for transport of goods to be conveyed may be attached to the conveying bodies.

The means for mutual supporting are preferably flexible connections between the conveying bodies, in particular a core leading through a plurality of conveying bodies, i.e. a continuous flexible element. Alternatively, the means for mutual support may be mutually engaging shapings on the conveying bodies. Advantageously, these shapings allow the conveying bodies to be drawn apart to any distance in a conveying direction. This means that the conveying bodies are only loosely connected in a separable manner, that they may only push, but not draw each other respectively.

In a preferred embodiment of the invention, mutually fitting shapings of the conveying bodies form a cylindrical joint or a ball-joint.

Between the different elements of the conveying device, i.e. guiding rail, conveying body and roll body, as well as inside the roll body, play or the possibility of movement outside the main direction of movement respectively is admissible. The play in connection allows a comparably loose connection of the elements moving against one another and all the same, a clean rolling of loaded rolls. Due to the play of the rolling body the rolls are loosely drawn and guided, such that a low friction and neither a mutual abrasion nor a canting or jamming due to low tolerances occurs.

In a different embodiment of the invention, the connecting body comprises: supporting regions in which the rolls are fitted and joint regions, which flexibly connect the supporting regions to each other.

The conveying bodies may comprise means for the intermittent support of objects to be conveyed, e.g. clamps or grippers. In a different embodiment of the invention the conveying bodies run around a central body, such that the central body may roll on a counter body. Hereby, the rolls and the conveying body replace a wheel for the central body. The central body may comprise means for the intermittent support of objects to be conveyed.

A roll body for a conveying device comprises a plurality of rolls mutually connected and distanced in linear manner, wherein the rolls are connected through a flexible and in particular also elastic connecting body. The connecting body, thus, forms a movable bearing cage, also called cage band (cage web). In a preferred embodiment of the invention, the cage band is bendable in at least two directions. For this purpose, the connecting body preferably comprises holding regions, into which the rolls are fitted and joint regions, which flexibly connect the holding regions to each other. The roll body may, thus, not only move on a flat orbit but also along an orbit which is set on a curved area. In other words: the roll body is reversibly bendable in two directions, wherein both these directions and one movement direction of the roll body respectively are perpendicular to one another.

A roll body with this kind of cage band or connecting body may be produced as a standardized mass product of any length and be diversely applied in different conveying devices, roll elements and bearings of manifold kind. By means of the use of one-piece, simply shaped, easily produced components and the allowance of play in the movements, smoothly running roll bodies may be manufactured in a very cost-effective manner.

The roll bodies according to the invention are particularly applicable in conveying devices as described in Swiss patent application CH 456/04 dated Mar. 18, 2004 and international application PCT/CH 2005/000144 dated Mar. 11, 2005 and basing on the priority of the first mentioned, as well as in roll elements as described in Swiss patent application CH 884/04 dated May 21, 2004 and international application PCT/CH 2005/000288 dated May 20, 2005 and relying on the priority of the former.

A drive of the conveying device may be implemented by a web, which is pressed against the conveying bodies and/or encloses a sequence of conveying bodies along a curve in the conveying line. A drive may also be implemented with e.g. drive cams, which are guided along the conveying bodies over a certain distance and engage on several conveying bodies. This kind of drive may be implemented by a driven roll element as described in Swiss patent application CH 885/04 dated May 21, 2004 and international application PCT/CH 2005/000289 dated May 20, 2005 and relying on the priority of the former. Hereby the rolls or protruding cams of a revolving roll body of the driven roll element engage in the conveying device and in particular in its conveying bodies.

The contents of the three cited Swiss and international applications is, thus, incorporated into the present application by reference.

In a preferred embodiment of the invention, the connecting body is a one-piece body, e.g. made of plastic and the rolls are fitted directly into the connecting body or via a bearing body or a roll ring.

In a different preferred embodiment of the invention, the rolls are one-piece (integrally formed) and have a barrel shape and bearing locations facing each other are provided on the respective insides of the supporting areas. On the rolls protruding axis elements, which in particular correspond with the form of the bearing locations, are provided. The rolls are fitted into the bearing locations by means of the axis elements. The term roller shape in particular comprises the form of a circular cylinder with circular cross-section or of a barrel-shaped, embossed cylinder or a cylinder with a slightly concave barrel. The rolls are advantageously made in one piece and made of metal or plastic.

On the other hand the insides of the supporting areas may comprise projecting bearing protrusions respectively facing each other and recesses preferably corresponding with the shape of the bearing locations are provided in the rolls. Thus, the rolls may be fitted into the bearing protrusions by means of the recesses.

In order to facilitate the fitting of the protruding axis elements or the bearing protrusions, respectively these preferably have a tapered shape, and in particular end in a point.

In a further preferred embodiment of the invention, the rolls are ball-shaped and snapped in place in the respective bearing bodies, which are fitted into the connecting body. The bearing bodies are in particular roll rings which enclose the rolls, such that the rolls may roll on two opposing sides on a different body. The bearing bodies may, however, also only enclose the rolls partially from one side, such that the rolls may roll on other bodies on three sides.

The rolls advantageously form a single linear succession or a line of rolls inside the roll body. It is also possible to arrange two or more lines of rolls next to each other inside the same roll body.

Further preferred embodiments emanate from the dependant claims.

BRIEF DESCRIPTION OF THE DRAWINGS

In the following the subject of the invention is explained in more detail by means of exemplified embodiments which are shown in the enclosed drawings. In diagrammatic manner

FIG. 7 shows a conveying device with circulating conveying bodies;

FIGS. 8 and 9 show roll bodies with ball-shaped rolls;

FIGS. 10 to 18 show roll bodies with barrel-shaped rolls; and

FIGS. 19 to 20 show further embodiments of roll bodies

DETAILED DESCRIPTION OF THE INVENTION

Figure 2:
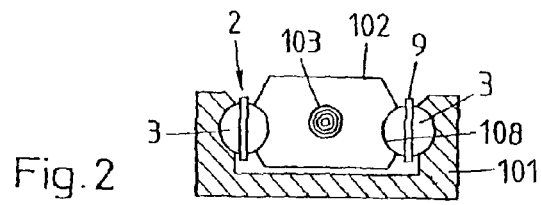
FIG. 2 shows the same conveying device in a sectional view.

The reference numbers used in the drawings and their references are listed in the reference list. In the figures similar parts are in principle designated with identical reference numbers.

Figure 1:
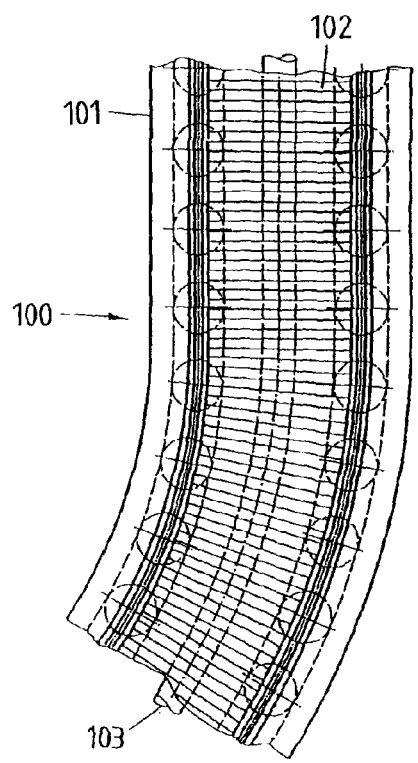
FIG. 1 shows a conveying device according to the invention in a top view.

FIG. 1 shows a conveying device 100 according to the invention in a top view and FIG. 2 in a sectional view. In a guiding rail 101 several conveying bodies 102 succeeding in a longitudinal direction are guided and supported through roll bodies 2 running on both sides. The conveying bodies 102 comprise a guiding groove 108 on each side, which corresponds with the shape of rolls 3. The rolling bodies 2 comprise connecting bodies 9 and rolls 3 embedded therein. The conveying bodies 102 are individual blocks or lamellae, wherein in a longitudinal direction several lamellae are provided per roll 3. The blocks or lamellae are connected by means of a core 103, i.e. a flexible cord, cable or monofilament running through the conveying bodies 102. Hereby the core 103 is loosely guided through the conveying bodies 102 or is connected to the conveying bodies, which restricts a torsion of the conveying bodies 102 around core 103. In both cases, the core 103 supports conveying bodies 102 in the regions in which they are not supported by the roll body 2 itself.

Figure 3:
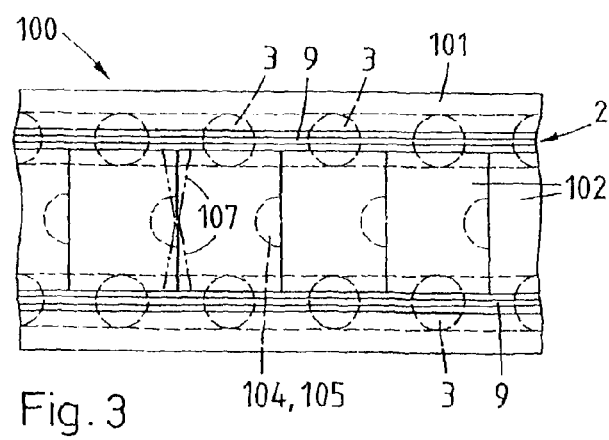
FIGS. 3 and 4 show a further conveying device in a top view and in a sectional view.
Figure 4:
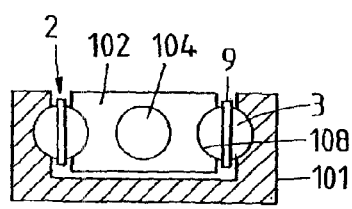

FIGS. 3 and 4 show a further conveying device 100 in a top view and in section. Here the conveying bodies 102 have the shape of blocks. In a longitudinal direction, approximately one conveying body 102 is provided per roll 3. In order for the conveying bodies 102 not to fall out of the guiding rail 101 they are provided with connecting elements 104, 105 for mutual support. Here these are correspondingly shaped joint convexities 104 and joint concavities 105, as described in detail in the following figures.

Figure 5:
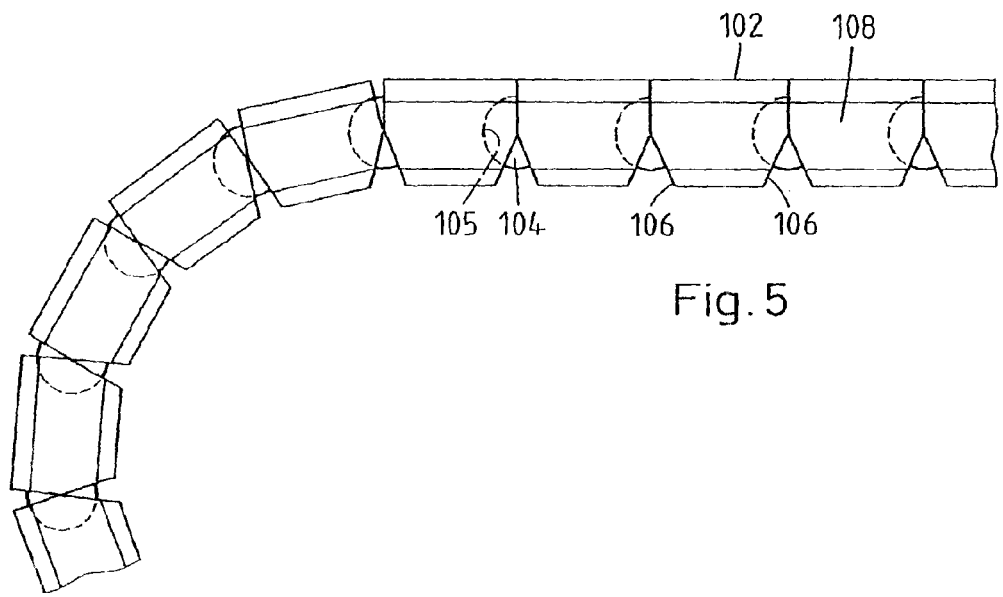
FIG. 5 shows a movement of conveying bodies in a curved embodiment of the further conveying device.
Figure 6A:
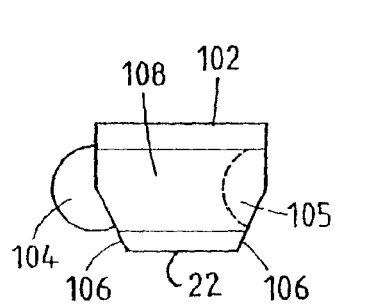
FIG. 6 shows corresponding conveying bodies.
Figure 6B:
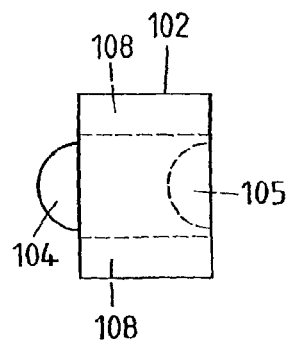
Figure 6C:
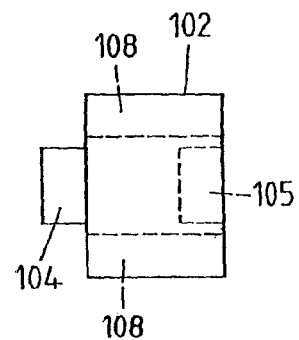

FIG. 5 shows a movement of conveying bodies 102 in a curved embodiment of the further conveying device 100. FIG. 6 shows corresponding differing variants of individual conveying bodies 102 in a mutual side view 6a and in differing top views 6b, 6c. The joint convexities 104 and the joint concavities 105 are ball-shaped (FIG. 6b) or cylindrical (FIG. 6c), whereas one respective joint convexity 104 of a conveying body 102 fits into one joint concavity 105 of a subsequent conveying body 102. The conveying bodies 102 are provided with one guiding groove 108 on each respective side, which groove corresponds with the shape of rolls 3.

The two roll bodies 2 of conveying device 100 or their direction of movement, respectively, thus run in a plane substantially parallel to both sides of conveying bodies 102 and their direction of movement, wherein the means 104, 105 for mutual support prevent a relative movement of conveying bodies 102 perpendicular to this plane. With a curved guiding rail 101, the direction of movement is to be understood as being tangential.

In order to, as in FIG. 5, enable a movement of the conveying bodies 102 out of this plane they comprise first bevelings 106 between the faces and an inner side 22. These bevelings begin, as can be seen in a lateral projection as in FIG. 5 or FIG. 6a, in the location of the cylinder axis or the ball center respectively. The first bevelings 106 lead from here to the inner sides 22 of conveying body 102, such that a succession of conveying bodies 102 may curve in a direction of its inner sides 22, wherein two respective conveying bodies 102 rotate around the intermediate joint 104, 105. If the conveying bodies 102 are pressed against one another, the upper parts of their faces come to lie against each other in a close fitting manner and prevent a downward buckling of the conveying bodies 102.

In a further preferred embodiment of the invention second bevelings 107 are provided on the face, which allows a curving of a succession of conveying bodies 102 in the same plane, along which plane the conveying bodies 102 and the roll bodies 2 running laterally along the conveying bodies 2 move. For this purpose the second bevelings 107, in a projection from above, i.e. in a view as in FIG. 3, 6b or 6c, lead from a line through the ball center to the sides left and right of the conveying body 102. By means of contact along this line the mutual support of the conveying bodies towards the bottom is ensured. Second bevelings 107 are drawn in exemplary manner in FIG. 3 in broken lines.

FIG. 7 shows a conveying device 100 with circulating conveying bodies 102 in a lateral view 7a and in a cross-sectional view 7b. The conveying bodies 102 run in a conveying course 17 and are laterally supported by a roll body 2 with ball-shaped rolls 3 in bearing grooves 14 of the conveying course 17. Alternatively to the roll body 2 with balls one of the roll bodies 2 with barrels presented further below may be used. In a fixedly installed conveying course 17 or guiding rail the quantity of conveying bodies 102 is usually larger than shown in the drawing and thus forms a conveying band or conveying chain. For this purpose the conveying bodies 102 may e.g. be equipped with grippers. The conveying bodies 102 may transport individual or bulk goods by means of their movement.

In a different manner of application, the arrangement according to FIG. 7 may be designed as a roll element 10, which can roll on a counter body 5 shown in broken lines, via the conveying bodies 102, which hereby act as support bodies 82. A central body 1 of the roll element 10 as well as an object connected to it may thus be conveyed in relation to the counter body 5 as a whole. The support bodies 82 and the roll bodies 2 thus replace a bearing of the central body 1 by means of wheels.

In the transition between the straight section and the curved section s2 with a determined curve radius the guiding rail 101, preferably, comprises an intermediate section s1 with a larger curve radius than the first curve radius. Thus it is prevented that a conveying body 102 tilts into the curved region when it is moved into this region and that the succeeding conveying body 102 is lifted away from the central body 1.

In a further preferred embodiment of the invention a guiding protrusion 109, which limits the guiding groove 108 towards the inside, is curved. Thus the abutting guiding protrusions 109 at least approximately form a segment of circle in the curved region of the orbit 17, along which segment the rolls 3 may roll in an even movement.

FIGS. 8 and 9 show rolling bodies 2 with ball-shaped rolls. FIGS. 8a and 8b show the complete roll bodies 2 in a top view 8a and a cross-sectional view 8b. FIGS. 9a, 9b and 9c show a connecting body 9 or cage band, a roll ring 83 in cross-section and a ball-shaped roll 3. The connecting body 9 on the one hand comprises ring-like supporting regions 91, into which the rolls are fitted by means of the roll rings 83 and on the other hand joint regions 92, which flexibly connect the supporting regions 91 to each other. The roll rings 83 are e.g. made of plastic and in one piece and comprise an inner area corresponding to a spherical area, such that the balls may be snapped into the rings 83. The roll rings 83 comprise a circumferential groove on their outer edges by means of which they are fitted into circular openings of supporting regions 91 of the connecting bodies 9. The connecting body 9 is preferably made of elastic flat material made of plastic or rubber or a blended fabric, e.g. by means of punching or water jet cutting.

In a preferred embodiment of the invention, the connecting body 9 comprises no narrow joint regions 92 but is a band of constant width, into which the rolls 3 are fitted.

FIGS. 10 to 18 show roll bodies with barrel-shaped rolls. FIGS. 10a and 10b show a roll body 2 in a top view 10a and a cross-sectional view 10b. FIGS. 11a and 11b show a connecting body 9 or cage band and a barrel-shaped roll 3. The connecting body 9 on the one hand comprises ring-like supporting regions 91, into which the rolls are fitted, and on the other hand joint regions 92, which flexibly connect the supporting regions 91 to one another. The connecting body 9 is preferably made of one piece and consists of a flexible or elastic, but not soft elastic material e.g. a plastic such as nylon. It is manufactured by means of injection molding or made of a flat material, e.g. by means of punching or jet cutting. The rolls 3 are also made of plastic or of metal, in particular of steel. In this embodiment of the invention the rolls 3 are conical and tapered in an axial direction, by which conical axis elements 95 are created, as may be seen in the detailed view according to FIG. 12. On the insides of the supporting regions 91 corresponding respective opposing cavities such as e.g. internal tapers are shaped to form bearings 94. These inner tapers effect the bearing of rolls 3. Instead of conical elements naturally a different form may be used for the bearing, e.g. a cylindrical form. The connection through the joint regions 92 is, viewed in the running direction of rolls 3, at least approximately arranged at the middle of rolls 3. This kind of cage band 9 may be bent within a plane transverse to the roll axes and in this manner may be used together with a central body 1 e.g. according to FIG. 7.

Due to the flexible and single connection by means of the joint regions 92 the connecting body 9 may, however, also be bent out of this plane, such that the central body 1 need not have a planar orbit. Furthermore the cage band 9 may be twisted through the joint regions 92 and, thus, the roll body 2 may follow a course, which requires a torsion of the roll body 2. This kind of roll body, thus, allows a multitude of applications and can additionally be produced in a simple manner in large quantities.

FIGS. 13 and 14 show a further roll body 1 in a top view 13a and a cross-sectional view 13b. FIGS. 14a and 14b show a corresponding connecting body 9 or cage web and a barrel-shaped roll 3. These are producible in a similar manner to those in FIGS. 10 and 11. For the manufacture of the roll 3 a further simplification is possible, as due to its simple form it may either be manufactured as an individual injection molded part or by cutting it off from a thick-walled tube. In this embodiment of the invention the rolls 3 accordingly comprise two recesses 97 for bearings, wherein these recesses 97 may also be formed by means of a continuous hole along the roll axis. The supporting region 91 of the connecting body 9 comprises opposing bearing protrusions 96, which snap into the recesses 97 when fitting the rolls. In order to simplify this, the bearing protrusions 96 as well as the axis elements 95 of the previous embodiment are preferably designed to be tapered and in particular acute.

FIG. 15 shows a further variant with a bearing protrusion on the support region 91 in a detailed view. FIG. 16 shows a variant of a roll body 2 of different proportions. FIG. 17 shows a variant of a roll body 2, in which the rolls 3 comprise protruding bearing axes 31, which are bedded in bearing openings of connecting body 9. In a variant with a top view according to FIG. 18a, the connecting body 9 comprises two separate halves or bearing bands, which respectively connect the bearing axes 31 on both sides of the roll body 2. Accordingly, the roll body 2 as a whole is only bendable in one direction. In order for the roll body 2 not to fall apart and all the same may be assembled, the bearing axes 31 e.g. lie in the bearing bands by means of a press fit and the rolls 3 are loosely rotatable around the bearing axis 31. In the variant according to FIG. 18b, as in the embodiments hitherto, a curve in two directions as well as a torsion or a contortion respectively is possible. Here again the bearing axes 31 may be fitted to the connecting body 9 by means of a press fit. The bearing axes may, however, also be shaped to fit the rolls 3 and lie loosely in the supporting regions 91 of the connecting bodies 9.

FIG. 19 shows a roll element 10 with a roll body 2 similar to the one of FIGS. 10 and 11. The roll body 2 circulates in an orbit 17 around a central body 1 and accordingly allows rolling and thus a bearing of roll element 10 with respect to connecting body 9.

FIG. 20 shows a movement of a roll body 2 in a curved guiding rail 101, e.g. in a curved roll element 10 seen from the movement direction of the roll body 2, here accordingly the movement of the rolls 3 is curved in two directions perpendicular each other and to the direction of movement.

Basically the different shown variants of cage bands 9, roll shapes, roll bearings, roll elements etc. may be combined and modified in a multiplicity of manners.

REFERENCE LIST

1 central body
10 roll element
12 straight section
14 bearing groove
16 inner edge of bearing groove
17 conveying course
2 roll body
22 inner side roll
3 roll
31 bearing axis
5 counter body
82 support body
83 roll ring
9 cage band
91 support region
92 joint region
94 bearing
95 axis element
96 bearing protrusion
97 recess, bore
100 conveying device
101 guiding rail
102 conveying body
103 core
104 joint convexity
105 joint concavity
106 first beveling
107 second beveling
108 guiding groove
109 guiding protrusion

The invention claimed is:

1. In a conveying device, between a guide and a conveying body, said conveying body received in the guide, the conveying body having a surface for conveying objects or bulk goods, a roll body comprising:

a plurality of rolls connected in linear manner, wherein the rolls are connected to and distanced from each other along a conveying direction by means of a flexible connecting body, wherein the connecting body is made in one piece, and wherein the rolls are ball-shaped and individually snapped into a plurality of roll rings, which are individually fitted into a plurality of support regions of the connecting body the roll body configured and operable to enable the conveying body to advance along the guide.

2. The roll body according to claim 1, wherein the roll rings comprise a circumferential groove on their outer edges by means of which they are fitted into circular openings of supporting regions of the connecting bodies.

3. The roll body according to claim 1, wherein the roll rings are shaped in one piece of plastic and comprise an inner spherical surface, such that the ball-shaped rolls may be snapped into the rings.

4. The roll body according to claim 1, wherein the connecting body is made of elastic flat material.

5. The roll body according to claim 4, wherein the connecting body is made of plastic or rubber or a blended fabric.

6. The roll body according to claim 1, wherein the connecting body comprises supporting regions, into which the ball-shaped rolls are fitted and joint regions, which flexibly connect the supporting regions to each other.

7. The roll body according to claim 6, wherein the joint regions are narrower than the supporting regions.

8. The roll body according to claim 7, wherein the roll body is bendable in at least two directions, wherein these two directions and a movement direction of the roll body are perpendicular to one another.

9. The roll body according to claim 2, wherein the roll rings are shaped in one piece of plastic and comprise an inner spherical surface, such that the ball-shaped rolls may be snapped into the rings.

10. The roll body according to claim 2, wherein the connecting body is made of elastic flat material.

\* \* \* \* \*